May 7, 1929.  E. H. MORRIS  1,712,396
DERRICK
Filed Oct. 1, 1927   10 Sheets-Sheet 4

May 7, 1929.  E. H. MORRIS  1,712,396
DERRICK
Filed Oct. 1, 1927  10 Sheets-Sheet 7

INVENTOR.
E. H. Morris.
BY Watson E. Coleman
ATTORNEY.

May 7, 1929.                    E. H. MORRIS                    1,712,396
                                  DERRICK
                      Filed Oct. 1, 1927      10 Sheets-Sheet 9

Fig. 17

INVENTOR.
*E. H. Morris.*
BY *Watson E. Coleman.*
                    ATTORNEY.

May 7, 1929.  E. H. MORRIS  1,712,396
DERRICK
Filed Oct. 1, 1927   10 Sheets-Sheet 10

INVENTOR.
E. H. Morris.
BY Watson E. Coleman.
ATTORNEY.

Patented May 7, 1929.

1,712,396

UNITED STATES PATENT OFFICE.

EARL H. MORRIS, OF UNIONTOWN, KENTUCKY.

DERRICK.

Application filed October 1, 1927. Serial No. 223,353.

This invention relates to derricks and more particularly to that class of derricks generally designated as stiff leg hoisting derricks.

An important object of the invention is to produce a device of this character which is so constructed as to render the same readily portable.

A further and more specific object of the invention is to produce a derrick of this character, wherein the stiff legs and derrick mast may be collapsed upon the main body of the derrick structure, so that the overall height of the derrick is not such that its portability is interfered with by overhead telephone wires, bridges, viaducts or the like.

A still further and more specific object of the invention is the provision of a mast mounting of such design and construction that the mast may be very readily moved to and elevated from the horizontal position which it occupies during transportation to a vertical working position perpendicular to the general horizontal plane of the bull wheel, which constitutes the mounting for the mast, the connection between the mast mounting and bull wheel being so constructed as to allow such flexibility that the position of the bull wheel is not changed during the raising and lowering of the mast and at the same time when the mast is elevated to vertical working position, it may be very rigidly supported from and locked to the bull wheel.

A further object of the invention is to provide means whereby the various bracing and supporting members of the mast which are normally, during operation of the derrick, spread out to such an extent that they increase the width of the derrick to a point prohibiting its passage along an ordinary thoroughfare, may be collapsed or readily bodily removed from the derrick, so that the width of the derrick is reduced to a point rendering its transportation easy.

A still further object of the invention is the construction of these removable parts in such manner that they may be readily combined to form a trailer for supporting and transporting still other removable parts.

A still further object of the invention is to produce a derrick of this character so constructed that a cable operated from the usual drum hoist of the derrick may be employed to shift the derrick from point to point.

A still further object of the invention is the provision of a derrick having wheeled support for transportation of such character that the derrick may be readily moved either longitudinally of its main carriage or, if desired, altered to operate over the tracks at right angles to the main carriage.

These and other objects I attain by the construction shown in the accompanying drawings, wherein for the purpose of illustration is shown a preferred embodiment of my invention and wherein:—

Referring now more particularly to the drawings, the derrick includes a main carriage having lay beams 10, which converge toward one another at one end. At the narrow end of the carriage, these beams have secured thereto at their under surfaces transversely extending sills 11, the ends of which project beyond the sides of the lay beams to provide mountings at their under surfaces for dolly trucks 12 which may be secured thereto in two positions at right angles to one another. In one of these positions, the wheels 13 of the dolly trucks are parallel to the longitudinal axis of the carriage and in the other position they are at right angles to the carriage and align with one another. It will be noted that these wheels have relatively broad supporting surfaces adapting the same for land travel which are centrally grooved at 14 to adapt the same for travel upon tracks. The grooves 14 of these wheels, when the wheels are extended in the same general direction as the axis of the carriage, are spaced apart a distance such that it may be readily engaged with the tracks of a right-of-way. At its upper surface, this end of the truck has applied thereto a supporting bed 15, which provides a mounting for the bull wheel pivot pedestal, generally designated at 16. A portion of this pedestal comprises a transversely extending beam 17, the ends of which overlie the extended ends of one of the sills 11 and coact therewith for the reception of a combined pivot and anchor pin 18. Secured to the forward end of the bed at the upper surface thereof is a support 19 upon which are mounted horizontally disposed pulleys 20, the purpose of which will presently appear. The under surfaces of the lay beams immediately inwardly of the forward end of the bed are connected by a transversely extending beam 21 having upon its forward face a sheave 22, the purpose of which will hereinafter appear.

At the wider end of the carriage, the carriage is provided with the central section of a truss. This central truss section includes vertical standards 23 arising from and suitably braced to the lay beams, the upper ends of which are connected by an upper chord section 24, the ends of which project beyond the outer faces of the standards 23. The standards and the beam 24 combine to provide an arch beneath which upon the carriage the usual drum hoist 25 may be mounted. Secured to and extending transversely of the lay beams and having their ends projected beyond the sides thereof are a pair of parallel beams 26 which form the central section of the lower chord of the truck. These beams at their centers and beneath the carriage provide a mounting for a pivot 27 for a steering carriage 28 having a tongue 29. This tongue has secured at its under surface a pair of opposed horizontally extending sheaves 30 between which a cable from a drum of the hoist which has been previously passed about the pulley 22 may be threaded. It will be obvious that if this cable is attached to a fixed support lying in front of or in front and to one side of the derrick and the cable taken up by the drum hoist, the derrick carriage will be bodily moved toward the point of attachment of the cable, the tongue swinging in response to the strain placed thereon by the tightening of the cable to direct the carriage. The wheels of this carriage are formed similarly to and spaced similarly to the wheels of the dollies supporting the rear or narrower end of the derrick carriage.

Figure 18:
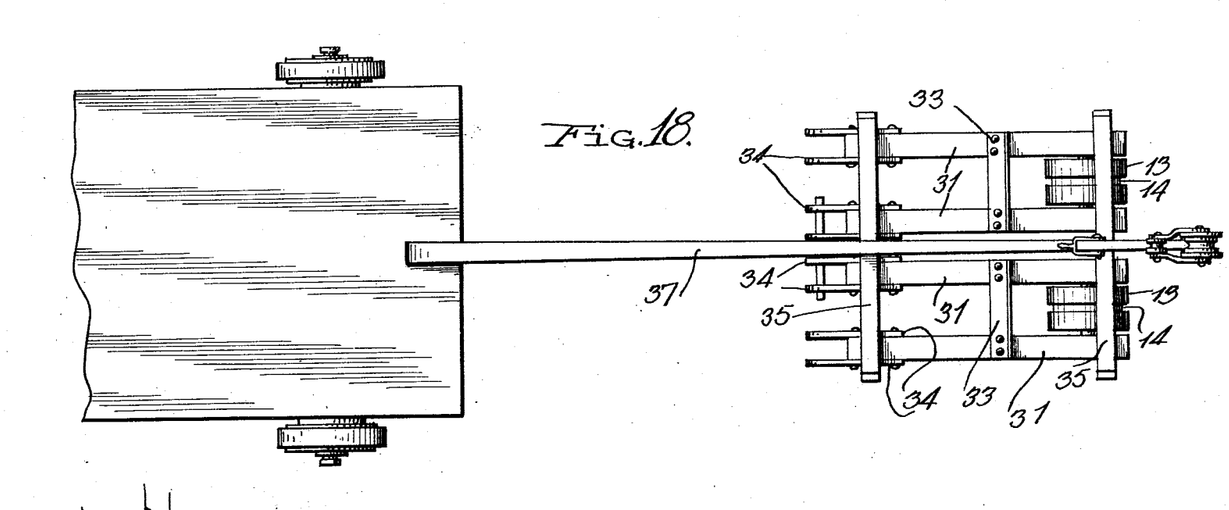
Figure 18 is a view in top plan showing the assembly for hauling the boom in connection with the truss end sections and trailer.
Figure 19:
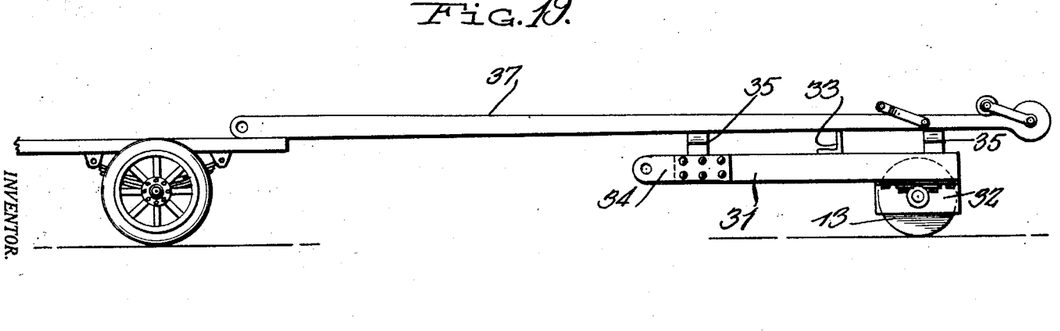
Figure 19 is a view in side elevation of the structure illustrated in Figure 18.

The outer end sections of the lower chord of the truss structure at the forward end of the derrick each comprise a pair of beams 31 connected at their outer ends by dollies 32 having the wheels thereof extended longitudinally of the beams, and adjacent their outer ends at their supper surfaces by transversely extending angle plates 33. At their inner ends, each beam provides a means whereby it may be pivotally connected with the corresponding beam of the central lower chord section, as indicated at 34. The outer sections of the upper chord of the truss each comprise a beam 35 adapted at its upper end to abut the standards 23 immediately beneath the projecting ends of the central upper chord section and at their lower ends to rest against the angle beam 33 and which form toe plates therefor. The outer ends of the lower chord sections have means for attaching thereto the outer forward ends of lay braces 36, the rear ends of which are mounted upon the combined pivot and anchor pins 18 previously mentioned. The forward ends of the lay braces may be swung inwardly against the sides of the lay timbers of the carriage and rest upon the projecting ends of the lower central chord section of the truss while the derrick is being transported from place to place. The outer sections of the lower chord of the truss may be secured to one another and to the outer sections of the upper chord of the truss to produce a trailer upon which one end of the derrick boom 37 and the derrick bucket may be supported during transportation of the device from place to place, as suggested in Figures 18 and 19.

The bull wheel pivot pedestal 16 comprises a casting having a central bore 39. The lower surface of the casting has ears 40 mounting the pivot shaft 41 of sheaves 42 which are substantially tangential to the axis of the bore. Surrounding the bore at the upper surface of the casting is a boss 44 and surrounding this boss in spaced relation thereto is a flange 45. The boss and its associated flange provide a step bearing for the hub 46 of the bull wheel which has a depending flange 47 surrounding the boss and extending into the annular space provided between the boss and flange. The flange 47 and boss 44 have coacting means at 48 preventing vertical displacement of the bull wheel. The rim of the bull wheel, indicated at 49, has a grooved periphery and is supported from the hub by radiating spokes 50. Supported from the rim in spaced relation thereto by rigid braces 51 is a yoke, generally designated at 52, three sides of which are integrally connected and the fourth side of which is a removable plate 53. The braces 51 are so arranged that they will not interfere with the passage of a mast 54 through this open side.

Upon the upper surface of the bull wheel are arranged spaced pairs of ears 55 and 56 having apertures which align for the reception of a pivot bolt 57 and an anchor pin 58. The derrick mast 54 has rigidly secured to the lower end thereof a casting 59 embodying apertured ears for the passage of the pivot pin 57 and anchor pin 58. This casting has also spaced apertured ears 60 at one side thereof through which is passed a pivot pin 61 providing a pivot for the lower end of the boom 37. The hub 46 of the bull wheel and casting 59 of the mast have aligned apertures for the passage of the derrick operating cables from the sheaves 42 and these cables are passed over and between sheaves 62 and thence up the boom to the usual sheaves carried by the upper end thereof. The sheaves 62 are arranged at the opposite side of the mast from that which opposes the removable plate 53, so that when the pin 58 is removed and the mast swung to horizontal position, these cables extend over the yoke to the head of the mast. The mast when in horizontal position lies over the carriage and may be held by a suitable support, generally designated at 63.

Figure 1:
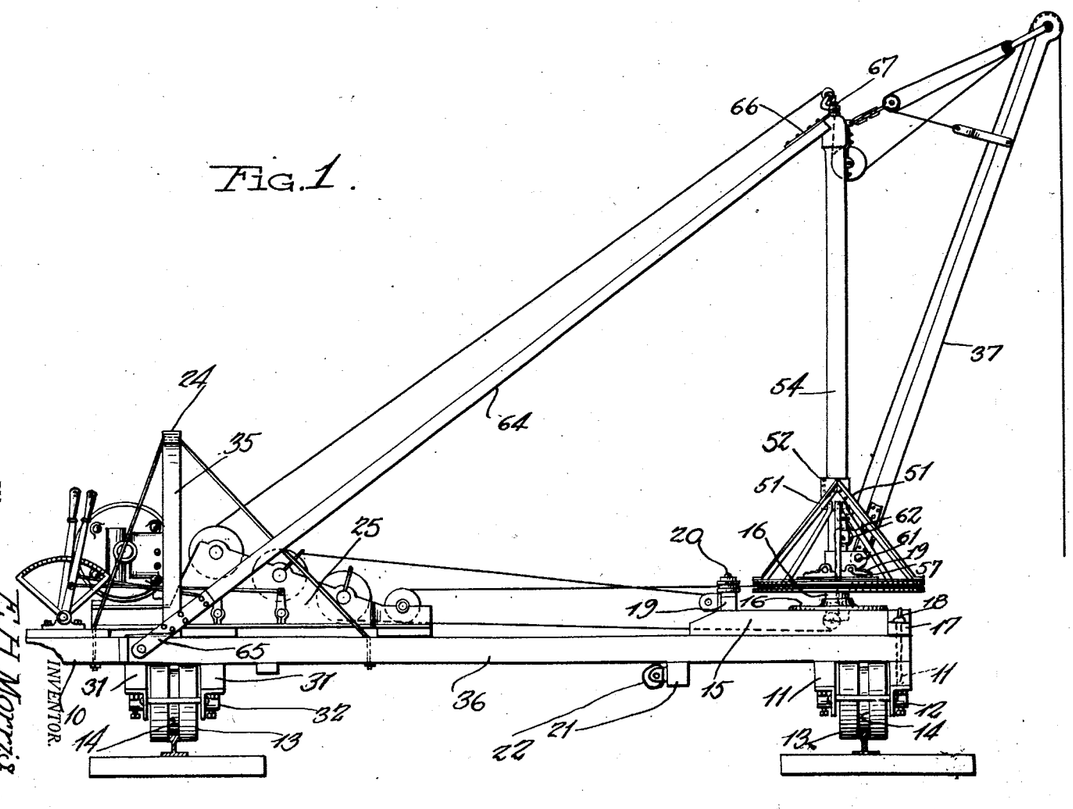
Figure 1 is a view in elevation of the right side of a derrick constructed in accordance with an embodiment of my invention.
Figure 2:
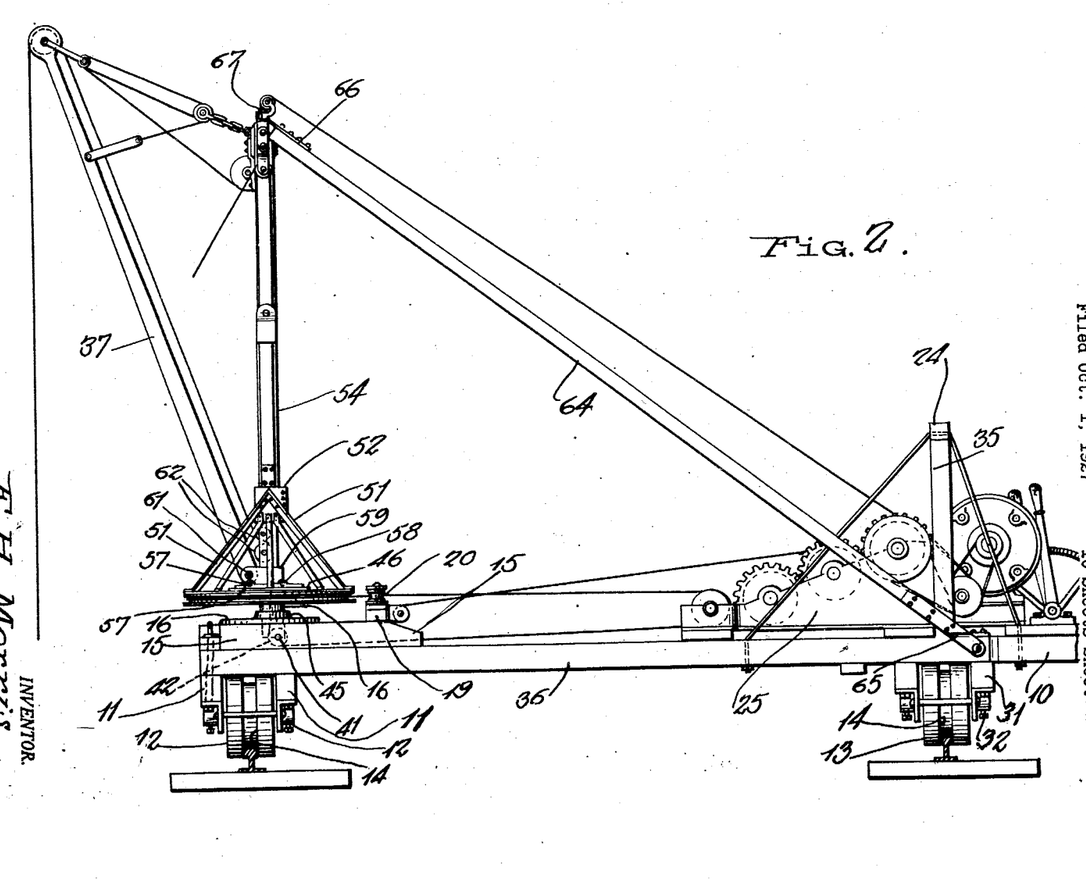
Figure 2 is a view similar to Figure 1 viewing the structure from the left side.
Figure 3:
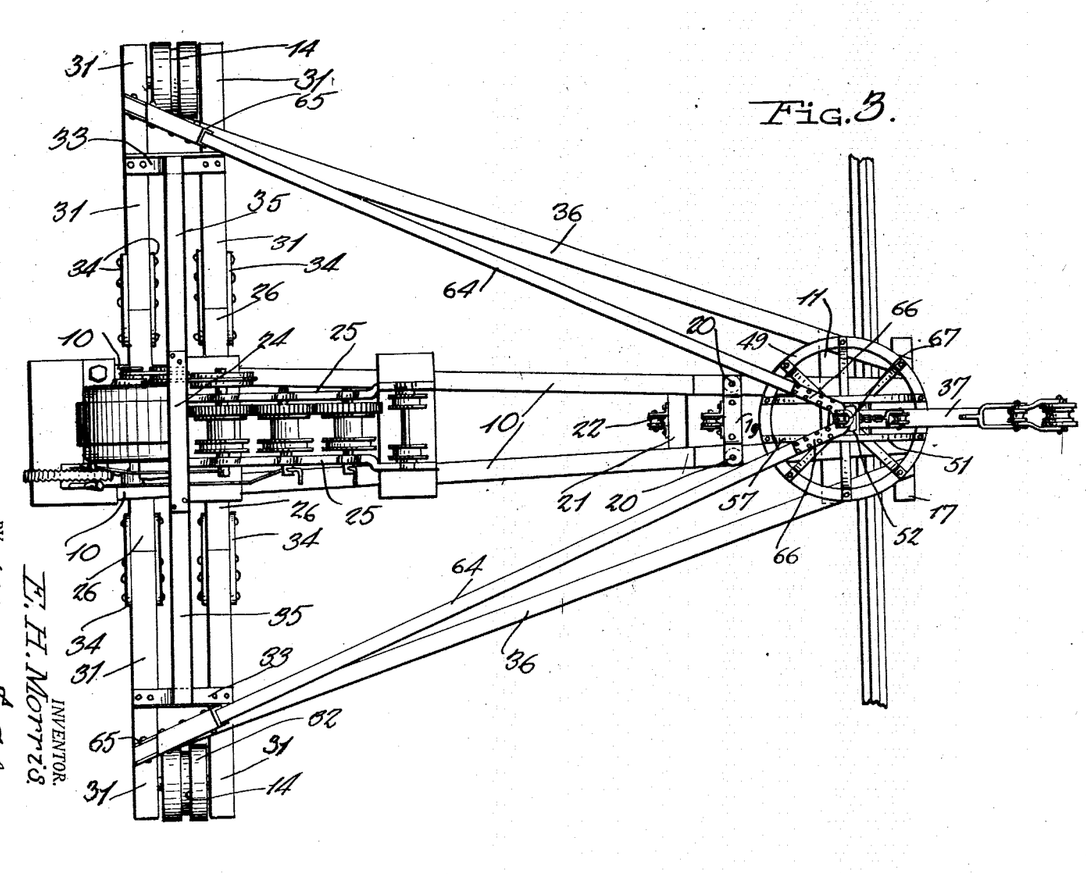
Figure 3 is a view in top plan of the structure as illustrated in Figure 1.
Figures 4, 5, 6:
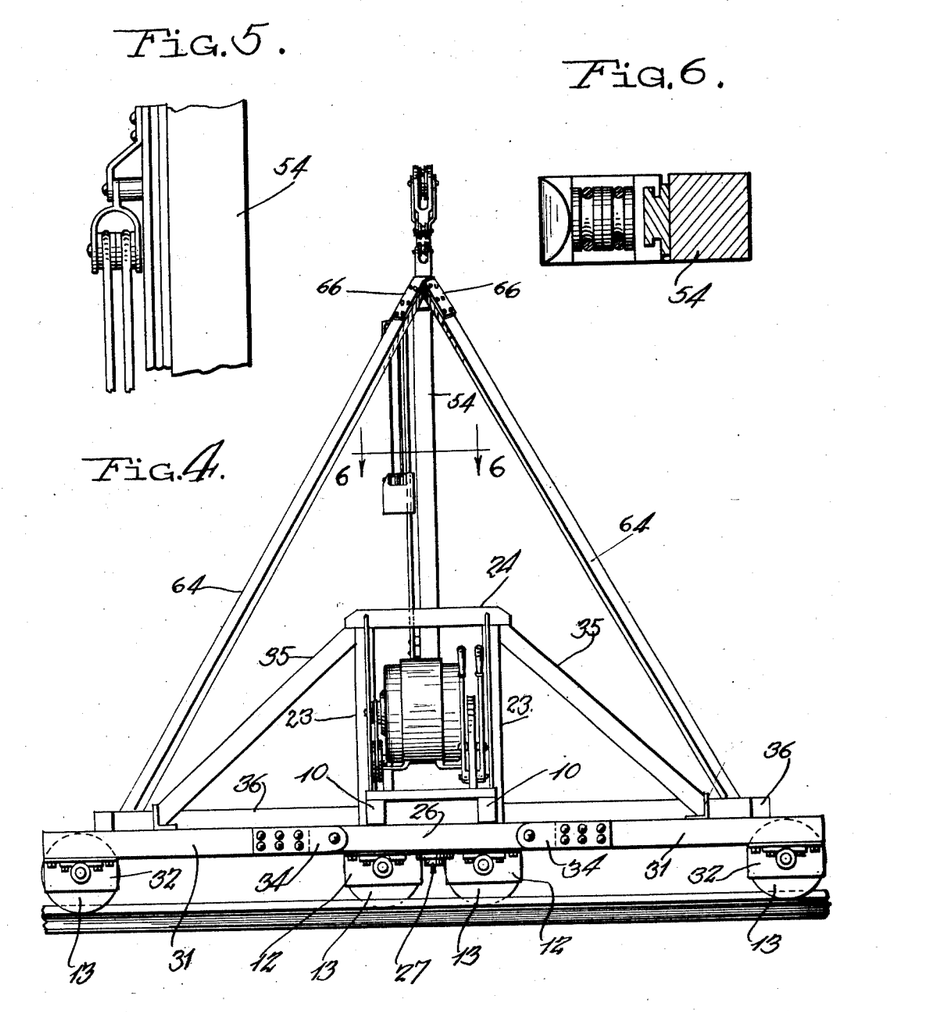
Figure 4 is a view in rear elevation of the structure as illustrated in Figure 1.
Figure 5 is a fragmentary elevational view of the upper portion of the mast illustrating the upper pulley hanger.
Figure 6 is an enlarged sectional view taken substantially on the line 6—6 of Figure 4.
Figures 7, 8, 9:
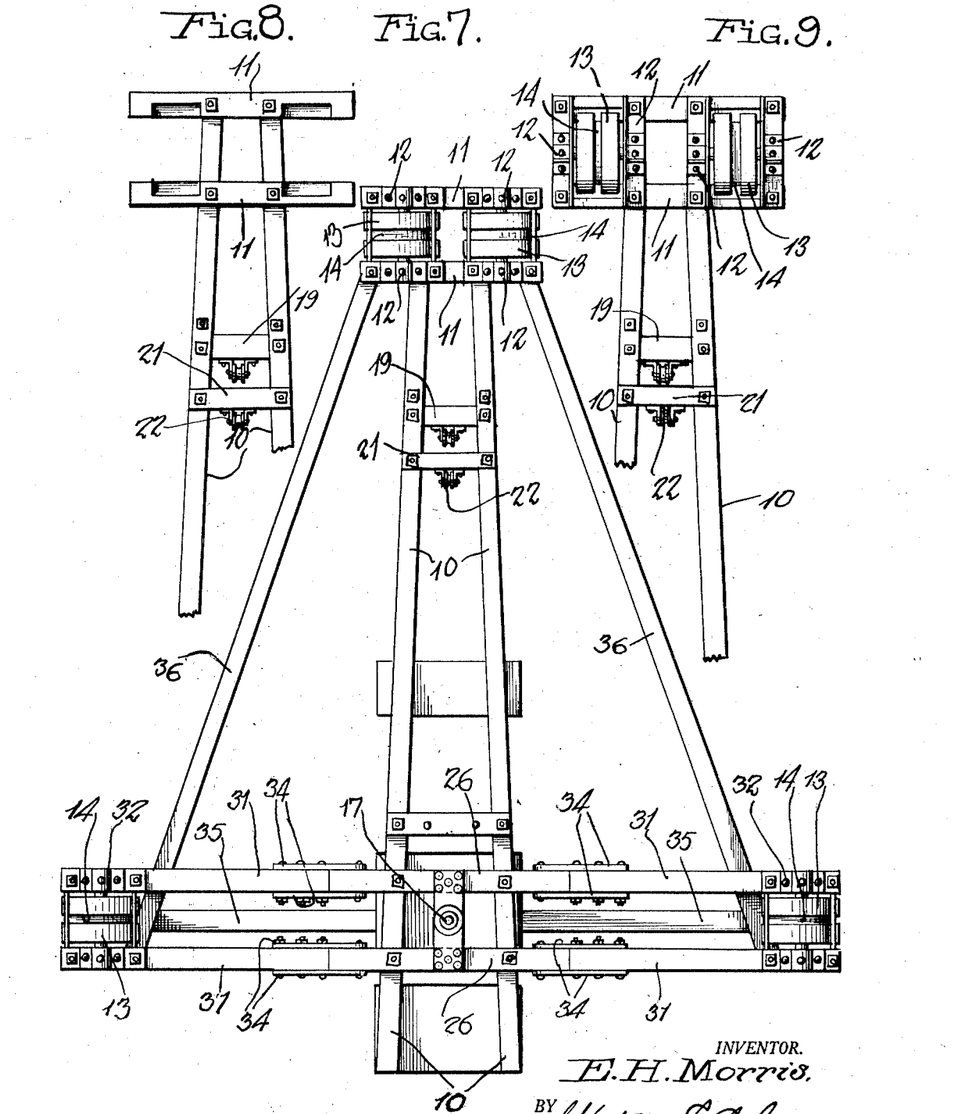
Figure 7 is a view in bottom plan of the structure as illustrated in Figure 1 with the superstructure omitted.
Figure 8 is a fragmentary view in plan of the structure illustrated in Figure 7 with the front dollies and the lay braces removed.
Figure 9 is a view in bottom plan of the forward portion of the bottom structure with the dollies in a second position.
Figure 10:
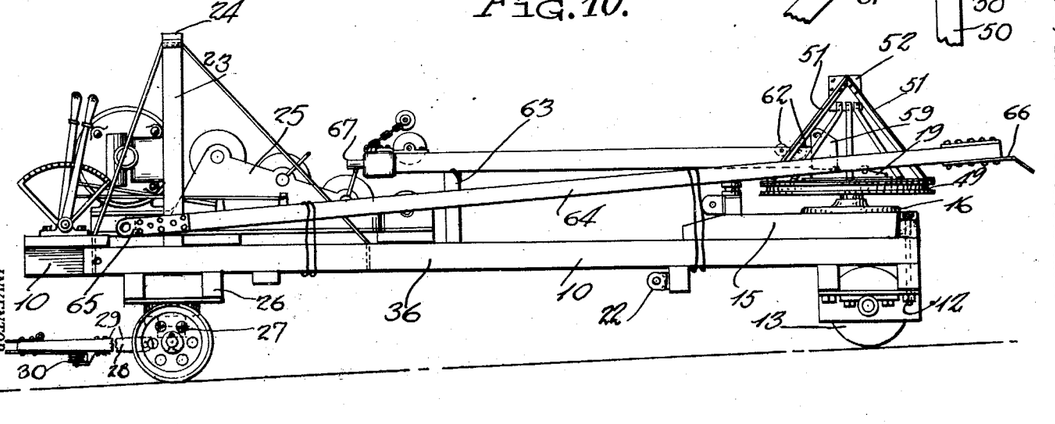
Figure 10 is a view in side elevation showing the derrick collapsed and arranged for transit.
Figure 11:
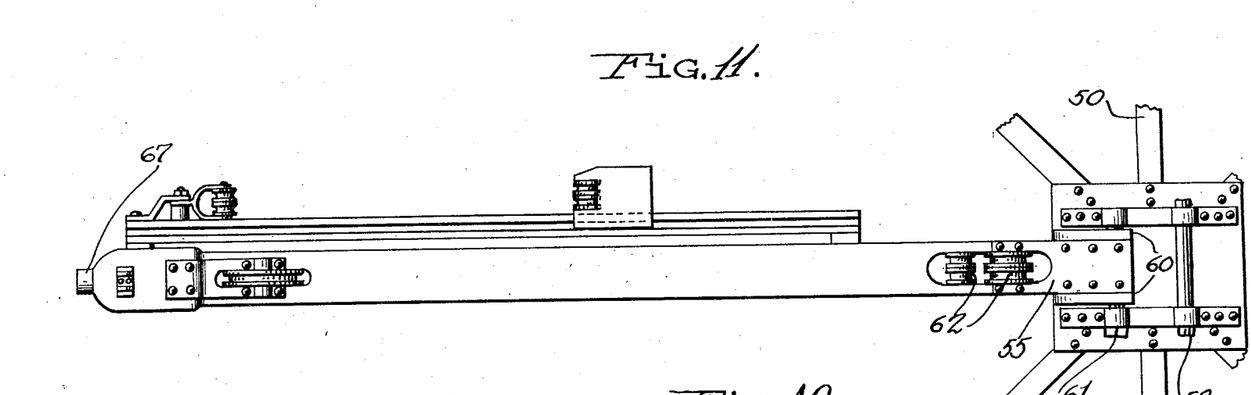
Figure 11 is a view in top plan of the mast in lowered position, an associated portion of the bull wheel structure being shown in fragment.
Figures 12, 13, 14:
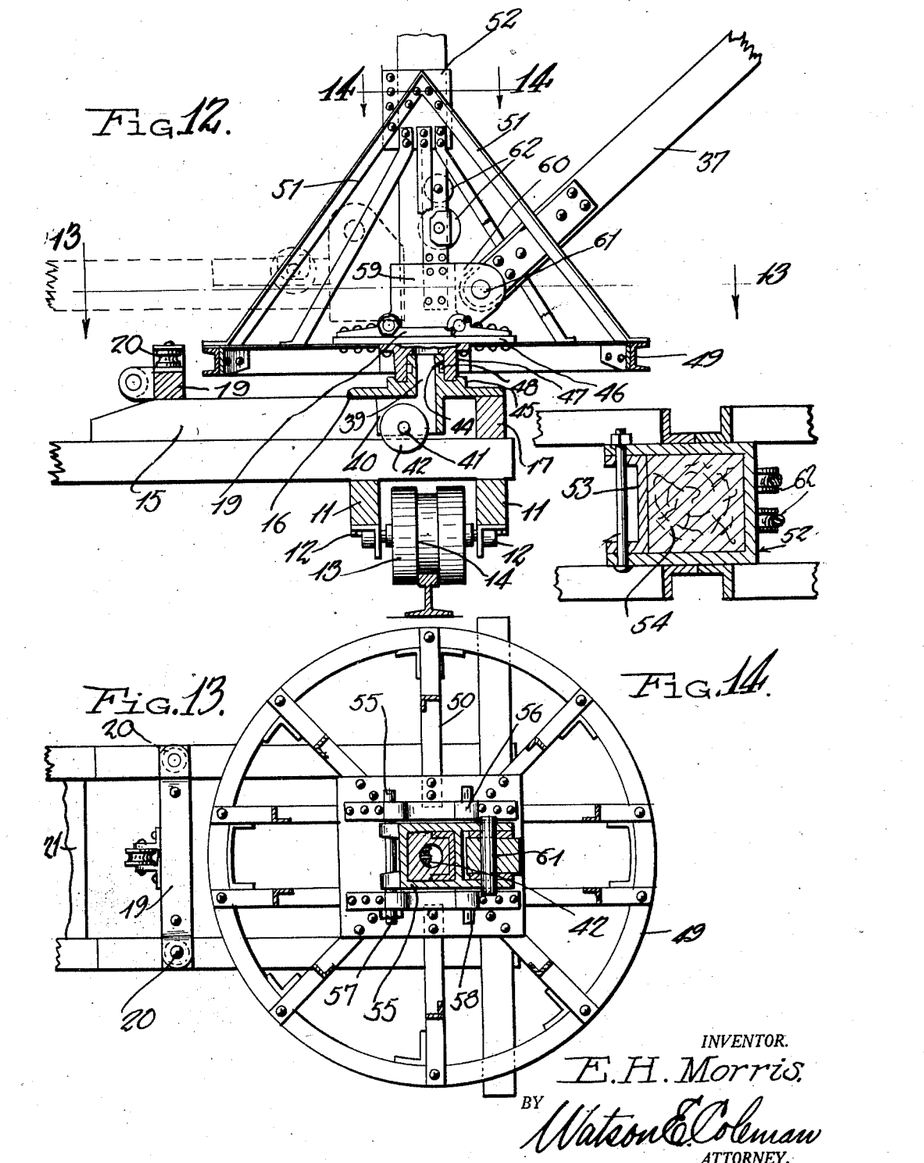
Figure 12 is an enlarged fragmentary view partly in elevation and partly in section illustrating the bull wheel structure and the parts directly associated therewith.
Figure 13 is a sectional view taken substantially on the line 13—13 of Figure 12.
Figure 14 is an enlarged sectional view taken substantially on the line 14—14 of Figure 12.
Figure 15:
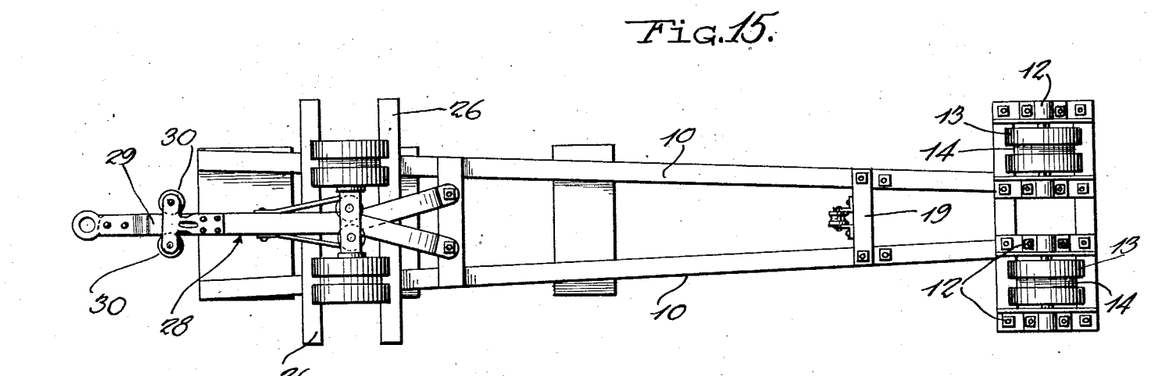
Figure 15 is a view in bottom plan of the stripped carriage assembly illustrating the steering truck.
Figure 16:
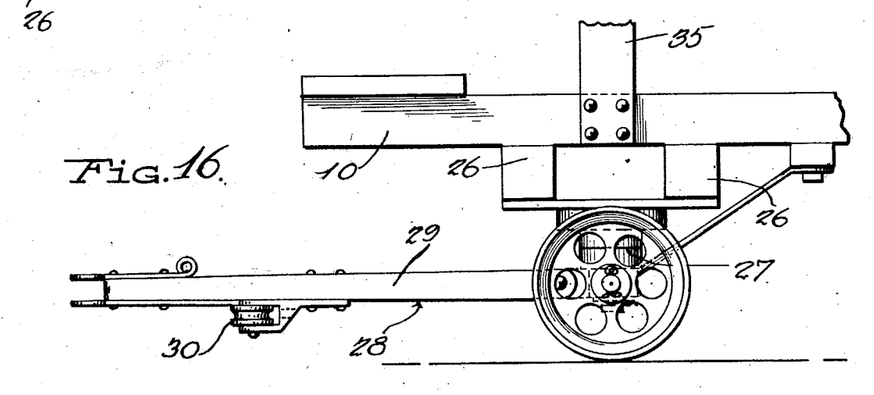
Figure 16 is a fragmentary view in side elevation of the forward portion of the structure illustrated in Figure 15.
Figure 17:
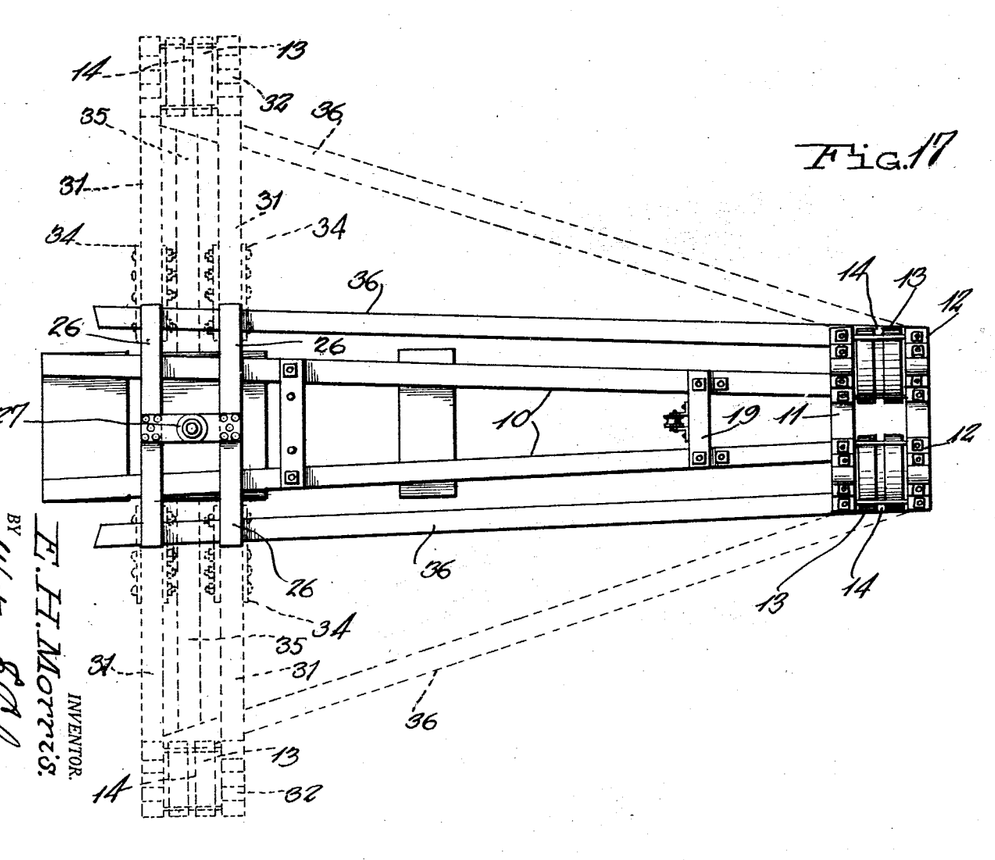
Figure 17 is a view in bottom plan of the bottom structure or carriage, the truss end sections and associated lay members being indicated by broken lines.

The derrick stiff legs designated at 54 have means at their lower end, as at 65, to engage the forward outer ends of the lay braces 36 and at their upper ends have the usual means, designated at 66, for engaging the usual mast head gudgeon pin 67. These stiff legs may be conveniently transported by securing them to the lay braces 36, as suggested in Figure 10.

From the foregoing, it will be readily seen that I have provided a derrick which may be very readily collapsed for transportation and which, when in its collapsed position, will be relatively narrow, so that it may be easily handled. In the operating position, however, the structure is stiff and rigid and because of the truss structure employed, the weight of the drum hoist employed as a source of power is placed against the mast at all times to support the same. When in position for operation, the derrick may be readily transversely shifted as is the case with the ordinary stiff leg derrick.

Since the construction hereinbefore set forth is capable of a certain range of change and modification without materially departing from the spirit of the invention, I do not limit myself to such specific structure except as hereinafter claimed.

I claim:—

1. In a derrick of the type having a pivotally mounted mast adapted to be lowered to a substantially horizontal position, a main carriage, means for mounting said mast thereon adjacent one end thereof, a truss structure extending transversely of the opposite end of the carriage and including upper and lower chords each formed in sections and having its central section permanently attached to the carriage and its outer end sections movable therefrom, and stiff legs for the derrick each engageable at one end with the upper end of the mast and at its opposite end with one of the outer ends of the truss.

2. In a derrick of the type having a pivotally mounted mast adapted to be lowered to a substantially horizontal position, a main carriage, means for mounting said mast thereon adjacent one end thereof, a truss structure extending transversely of the opposite end of the carriage and including upper and lower chords each formed in sections and having its central section permanently attached to the carriage and its outer end sections removable therefrom, stiff legs for the derrick each engageable at one end with the upper end of the mast and at its opposite end with one of the outer ends of the truss, and lay braces pivoted at one end to the first-named end of the carriage and attachable at their opposite ends to the outer ends of the truss section.

3. In a derrick of the type having a pivotally mounted mast adapted to be lowered to a substantially horizontal position, a main carriage, means for mounting said mast thereon adjacent one end thereof, a truss structure extending transversely of the opposite end of the carriage and including upper and lower chords each formed in sections and having its central section permanently attached to the carriage and its outer end sections removable therefrom, stiff legs for the derrick each engageable at one end with the upper end of the mast and at its opposite end with one of the outer ends of the truss, lay braces pivoted at one end to the first named end of the carriage and attachable at their opposite ends to the outer ends of the truss section, the ends of the lower chord of the truss structure projecting beyond the sides of the carriage to receive and support the ends of said lay braces during transportation of the derrick.

4. In a derrick of the type having a pivotally mounted mast adapted to be lowered to a substantially horizontal position, a main carriage, means for mounting said mast thereon adjacent one end thereof, a truss structure extending transversely and at the opposite end of the carriage and having its end portions removable, stiff legs, and means for connecting the stiff legs to the upper end of the mast and to the outer ends of the truss.

5. In a derrick of the type having a pivotally mounted mast adapted to be lowered to a substantially horizontal position, a main carriage, means for mounting said mast thereon adjacent one end thereof, a truss structure extending transversely and at the opposite end of the carriage and having its end portions removable, stiff legs, means for connecting the stiff legs to the upper end of the mast and to the outer ends of the truss, and lay braces pivoted to the first-mentioned end of the main carriage and detachably connectable with the outer ends of the truss.

6. In a derrick of the type having a pivotally mounted mast adapted to be lowered to a substantially horizontal position, a main carriage, means for mounting said mast thereon adjacent one end thereof, a truss structure extending transversely and having its end portions removable, stiff legs, means for connecting the stiff legs to the upper end of the mast and to the outer ends of the truss, and lay braces pivoted to the first-mentioned end of the main carriage and detachably connectable with the outer ends of the truss, the central section of the truss structure projecting beyond the sides of the main carriage and adapted to receive the ends of the lay braces when the end sections of the truss are removed.

In testimony whereof I hereunto affix my signature.

EARL H. MORRIS.